United States Patent [19]

Kirschbaum

[11] 4,357,542

[45] Nov. 2, 1982

[54] WIND TURBINE GENERATOR SYSTEM

[75] Inventor: Herbert S. Kirschbaum, Wilkins Township, Allegheny County, Pa.

[73] Assignee: Westinghouse Electric Corp., Pittsburgh, Pa.

[21] Appl. No.: 57,055

[22] Filed: Jul. 12, 1979

[51] Int. Cl.³ .................... F03D 11/00; H02H 7/06
[52] U.S. Cl. ...................................... 290/44; 322/35
[58] Field of Search ............... 290/4 R, 4 C, 43, 44, 290/54, 55; 307/45, 86, 87; 322/35, 95, 96

[56] References Cited

U.S. PATENT DOCUMENTS

| | | | |
|---|---|---|---|
| 1,549,872 | 8/1925 | Hebeler et al. | 322/95 |
| 2,360,792 | 10/1944 | Putnam | 290/4 R |
| 3,558,983 | 1/1971 | Steen | 361/58 |
| 4,112,311 | 9/1978 | Theyse | 322/35 X |
| 4,138,619 | 2/1979 | Broadway et al. | 310/184 |
| 4,139,780 | 2/1979 | Hucker et al. | 307/86 |
| 4,242,628 | 12/1980 | Mohan et al. | 322/95 |

FOREIGN PATENT DOCUMENTS 177542 3/1922 United Kingdom ................ 322/95

OTHER PUBLICATIONS

Franklin et al.; Additional Extraction of Wind Energy from 60 Meter Aerogenerator Using a Two-Speed Pole Charging Induction Generator; Mar. 1979, printed by Central Electricity Generating Board, London.
Rawcliffe, "3-Speed Single Winding Induction Motors", 2-28-64, Electrical Rev., pp. 330-332.
Jayadev, "Windmills Stage a Comeback", 11/76 IEEE Spectrum, pp. 45-49.

Primary Examiner—B. Dobeck
Assistant Examiner—Shelley Wade
Attorney, Agent, or Firm—Z. L. Dermer

[57] ABSTRACT

Wind turbine generator systems incorporating a multi-speed pole amplitude modulated type dynamo electric machine allowing efficient operation at consecutive speeds in a ratio preferably less than 2:1. A current limiting reactor, preferably including an inductance coil, and an over-running clutch, are utilized in conjunction with any multi-speed generation system to alleviate impact on a utility grid during switching among operational speeds.

1 Claim, 14 Drawing Figures

WIND TURBINE GENERATOR SYSTEM

BACKGROUND OF THE INVENTION

1. Field of the Invention

This invention relates to wind turbine generator systems and multi-speed generation systems.

2. Description of the Prior Art

Large wind turbine generator (WTG) systems have, in the past, been typically confined to constant, single speed operation. Efficiency at constant speed, however, is limited since there is only a single wind speed at which maximum wind power can be extracted and useful energy, typically electrical, generated. Meteorological conditions typically dictate variable wind velocities daily and annually, and wind speeds above or below the single design wind speed value result in less efficient energy capture. The term energy capture refers to the amount of useful energy, for example electrical, generated as a percentage of the energy in the available prevailing wind.

More recently continuously variable or multi-speed wind turbine generators have been considered. For example, variable speed generation can be achieved through use of a variable frequency alternating current generator followed by a rectifier and an inverter. Variable speed transmissions have also been proposed. While such variable speed devices increase turbine efficiency, they do not necessarily increase overall system efficiency. Also proposed have been discrete speed conventional generators, such as two speed units, as well as hydraulic pump/motor combinations where a hydraulic motor drives a conventional generator.

While such systems offer increased turbine efficiency relative to single speed machines, they are not without deficiencies. For example, such systems are more complex and costly regarding design, manufacture, operation and maintenance. These complexities, including additional components and typically additional mass, are also carried through to support structures and other associated subsystems. System efficiencies can also be impaired due to additional losses such as in the rectifiers and inverters. Further, use of a conventional generator, or a conventional motor operating as a generator, involving multiple coils, one of which is typically not used at a given operational speed, makes inefficient use of fabrication materials.

It is therefore desirable to provide alternate wind turbine generator systems which achieve high energy capture and which further alleviate the complexities and inefficiencies associated with existing and proposed wind turbine generator systems.

SUMMARY OF THE INVENTION

This invention provides wind turbine generator systems which achieve high energy capture while alleviating the complexities and inefficiencies of prior wind turbine generator systems. In a preferred form the wind turbine generator system includes a variable pitch horizontal axis turbine, coupled to a horizontal turbine shaft, both of which rotate as a result of the forces of a prevailing wind. The rotational energy of the turbine shaft is transferred to rotational energy of a shaft of a dynamo electric machine or generator, typically through a gear box which provides an increased generator shaft rotational velocity relative to the turbine shaft velocity. The dynamo electric machine is a pole amplitude modulated motor (PAM) operated as a generator, preferably wound and connected to operate at discrete speeds in a 1.5:1 or other selected speed ratio.

The actual generator operational speed ratios are fixed through winding design and pole connection, and will vary dependent upon design requirements which optimize energy capture. The generator provides useful electrical energy, for example to a utility grid, and is selectively connected to operate at the appropriate one of its discrete speeds through an actuator and control logic which includes an overlap band to avoid undesirable multiple switching when wind speeds alternate in a short period of time about a selected value. The actuator control preferably includes a time average of a desired parameter, such as wind speed or generator output, so as to avoid excessive switching among operational speeds.

Additionally provided is the incorporation of a series current limiting reactor, such as those including inductance coils, connected across the main breaker to a utility bus which, in conjunction with any multi-discrete speed generator system tends to isolate the utility bus from sudden voltage and current changes in the generation system during periods of speed change. An overrunning clutch is preferably also utilized to minimize torque imposed stresses upon the speed increasing gear box components during periods of speed change.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
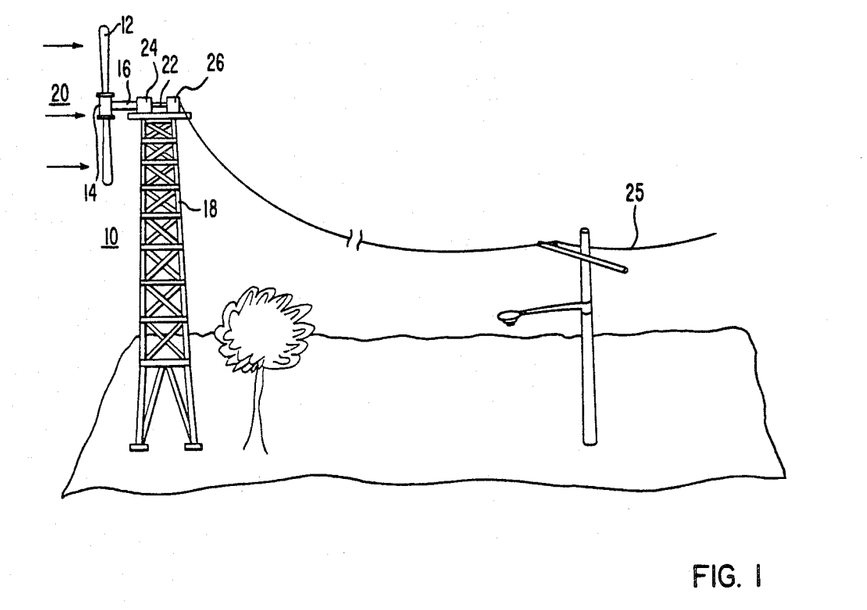
FIG. 1 is a simplified schematic of a wind turbine generator system in accordance with the invention.

Referring now to FIG. 1 there is shown a simplified schematic of a wind turbine generator 10 (WTG) system in accordance with the invention including a wind turbine 12, a turbine hub 14, and turbine shaft 16 mounted atop a tower 18 and exposed to a wind environment 20. Means are provided for converting the rotational energy of the turbine shaft 16 to rotational energy of a generator shaft 22 at a different speed, such as a gear box 24 which increases the speed of the generator shaft 22 relative to the turbine shaft 16. A dynamo electric machine, herein also referred to as a generator 26, described more fully hereinafter, converts the rotational energy of the generator shaft 22 to useful energy, such as electrical energy ultimately provided to a utility line 25.

The power equation for the wind turbine generator is power, in kilowatts, $P = \simeq K \times \rho/2\ V^3 A C_p$, where:

K is a conversion factor from foot pound/second to KW, $\rho$ is the air density in slugs per ft$^3$, V is the velocity of the wind at the hub elevation in ft/second, A is the swept area of the rotor in ft$^2$, and $C_p$ is the dimensionless rotor power coefficient.

The rotor power coefficient is characteristic of the efficiency of a wind turbine generator system and is a function of many parameters including the twist, thickness and chord profiles of the rotor, the lift and drag characteristics of the particular rotor airfoil geometry chosen, the rotor pitch relative to the plane of rotation of the rotor, and the ratio of rotor tip speed to the upstream wind speed. As will be noted, it is desirable for the wind turbine generator system to operate as near as possible to the maximum $C_p$.

Figure 2:
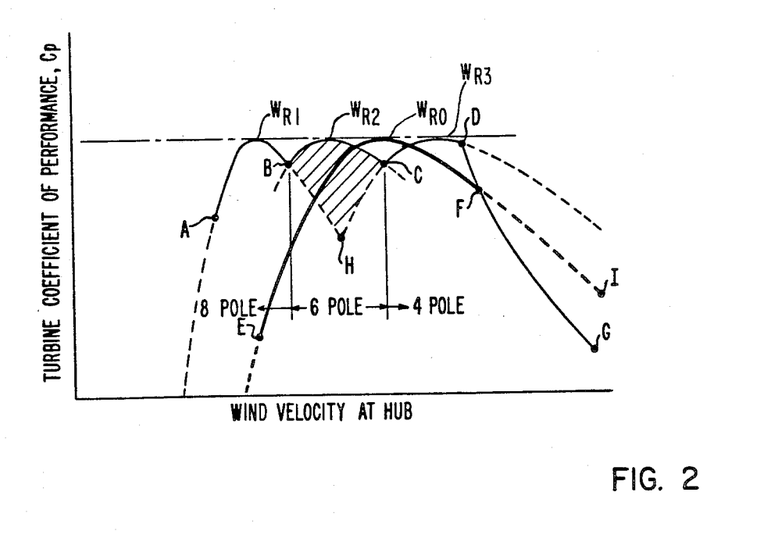
FIG. 2 is a graph plotting wind velocity at the wind turbine hub (X axis) vs. turbine coefficient of performance, $C_p$ (Y axis)

FIG. 2 is a graphical representation of $C_p$ as a function of wind velocity at the elevation of the turbine hub 14. The curves represent four turbine shaft 16 rotational speeds wherein $\omega_{R3} > \omega_{R0} > \omega_{R2} > \omega_{R1}$ and line D-F-G represents pitch control on the turbine blade 12 above a selected speed to maintain a constant full power output. For a single speed wind turbine generator the selection of $\omega_{R0}$, the rotational velocity of the wind turbine 12 in revolutions per minute, is typically made by maximizing annual energy capture based upon both the average wind speed and also the dispersion of the wind speed about the average. As shown from plot E-F, operation at or near the maximum rotor power coefficient, $C_p$, occurs for a relatively small range of wind velocities. Better energy capture can be achieved by a wind turbine generator system which operates at two or more discrete turbine rotational speeds. For example, operation along plot A-B-H-C-D can be achieved in a two speed system incorporating a conventional generator having one set of stator windings with a typical 2:1 operational speed ratio obtained by using the well-known consequent pole connection principle. This can also be obtained by a conventional generator having two distinct sets of windings. The 2:1 rotational speed ratio, however, results in a deep efficiency loss cusp along line B-H-C, represented by the shaded area of FIG. 2. The cusp can be closed by providing two operational speeds which are closer together, or by providing a third speed in the region of the cusp. This is advantageously and simply achieved by use of a pole amplitude modulated motor (PAM) operated as a generator 26, preferably at a two speed ratio of 1.5:1 or a three speed ratio of 2:1⅓:1, for which a pole amplitude modulated motor is ideally suited. Such motors can also operate at other advantageous speed ratios dependent upon the overall particular wind turbine generator system characteristics. The synchronous speed of such induction machines is dependent upon the frequency of the exciting voltage and the number of pole pairs for which it is wound. This synchronous speed, $R_S$, in revolutions per minute, is $$R_S = 60\ f/p$$

where f is the excitation frequency in Hertz and p is the number of pairs of poles of the winding. Table I shows the synchronous speeds for an exemplary machine wound for 4, 6 and 8 poles and operated on a 60 Hertz utility grid.

TABLE I

| Number of Poles | Number of Pole Pairs | Synchronous Speed (RPM) | Relative Speed |
|---|---|---|---|
| 4 | 2 | 1800 | 2 |
| 6 | 3 | 1200 | 1⅓ |
| 8 | 4 | 900 | 1 |

Operation along plot A-B-C-D of FIG. 2 is achieved with a pole amplitude modulated motor having, for example, eight pole-six pole-four pole connections, obtainable with a single winding, so as to provide a desired 2:1⅓:1 speed ratio. Other ratios and pole combinations are equally possible, for example the combinations four pole/six pole, six pole/eight pole, eight pole/ten pole, ten pole/twelve pole, and so forth, and the series ten pole/fourteen pole, fourteen pole/eighteen pole, eighteen pole/twenty-two pole, twenty-two pole/twenty-six pole, and so forth, are commercially available from the Westinghouse Electric Corporation, Pittsburgh, Pa. Any similar combination of pole numbers can be obtained provided that consecutive speed and pole ratios do not exceed 1.5:1. As with conventional induction motors, upon application of an external torque to the motor shaft in the direction of rotation, the motor will run at a rotational speed in excess of synchronous speed. Under these circumstances, where the torque is provided by action of the wind through a turbine 12, turbine shaft 16 and gear box 24 to the motor/generator shaft 22, the motor reverses function and generates electrical energy which flows to a utility bus 27.

Although PAM motor technology is well known and commercially available, a brief summation is herein presented. The basis of a PAM motor, or a PAM motor operating as a generator as herein disclosed, depends upon the principle of amplitude modulation of the mmf distribution in the air gap of the machine. For example, for a p$_1$ pole machine the mmf distribution from one of the phases, in the fundamental component, around the air gap is $$M(\theta) = M_{max} \sin\ (p_1/2\theta)$$

where:

$M_{max}$ is the maximum value of the mmf distribution, $\theta$ is the angular distance in radians around the periphery of the air gap, and P$_1$ is the number of poles for which the machine is wound.

P$_1$ must be an even integer. In the PAM design the maximum mmf, $M_{max}$, becomes a modulation parameter of the form $$M_{max} \sin\ (p_2/2\theta)$$

where $p_2$ is an even integer. This is accomplished by selected unequal choices of phase groups and reversal of selected phase groups in the phase winding. There is a great deal of flexibility available to the designer depending upon design requirements such as variable torque, constant torque, constant horsepower or, as disclosed, constant power output when operating as a generator. With modulation of the mmf distribution it becomes:

$$M(\theta) = M_{max} \sin\left(\frac{P_2}{2}\theta\right) \sin\left(\frac{P_1}{2}\theta\right) \text{ or, } M(\theta) =$$

$$\frac{1}{2} M_{max}\left[\cos\left(\frac{P_2 - P_1}{2}\right)\theta - \cos\left(\frac{P_2 + P_1}{2}\right)\theta\right]$$

Thus there is present in the above mmf distribution a $(p_2-p_1)$ pole field and a $(p_2+p_1)$ pole field. Since the mmf is for one of the three phases of a polyphase machine, it is possible to combine all three mmf's so that in the combined field one or the other of the poles disappears. Thus, for a two speed PAM unit there is a choice of modulating upward, $p_2+p_1$, or modulating downward, $p_2-p_1$. Experience in design has led to the conclusion that generally modulating the number of poles downward and increasing the operational speed usually provides the best overall power rating and performance upon combining two speeds.

Three speed single winding PAM units are also available typically in "star" and "delta" circuits. Two possible sets of pole combinations which provide three operational speeds are presented in Table II, where W, X and Z respectively represent the number of poles for a PAM motor operating as a generator in the high speed, intermediate speed, and low speed configurations.

TABLE II

Sets of Pole-Combinations For Three-Speed PAM Windings

| Pole Numbers | | | Pole Numbers | | |
|---|---|---|---|---|---|
| W | X | Z | W | X | Z |
| 4 parallel/2 parallel/Series | | | 4 parallel/2 parallel/Series | | |
| W | W + 2 | W + 4 | W | W + 4 | W + 2 |
| W | W + 6 | W + 8 | W | W + 8 | W + 6 |
| W | W + 10 | W + 12 | W | W + 12 | W + 10 |
| W | W + 14 | W + 16 | W | W + 16 | W + 14 |
| W | etc. | etc. | W | etc. | etc. |

These possible pole combinations are more fully explained in an article entitled "Three-Speed Single-Winding Induction Motors, Electrical Review" Feb. 28, 1964, G. H. Rawcliffe. While design theory of polyphase windings is detailed, the manufacture of the machines is relatively simple and provides more efficient utilization of fabrication materials than conventional two winding induction motors or consequent pole motors.

Figure 3:
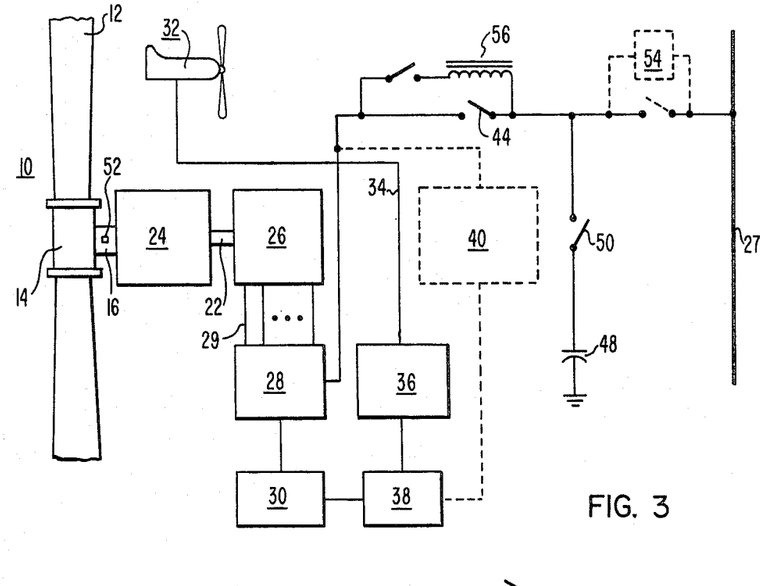
FIG. 3 is a simplified block diagram of a wind turbine generator system in accordance with the invention.

A system utilizing a multi-speed PAM motor as a generator is illustrated in FIG. 3, additionally showing means for selectively switching the PAM generator and the wind turbine generator system from operation at one speed to operation at another speed. A contactor assembly 28 is provided which selectively connects to the proper number of terminals, typically six for a two speed PAM generator or twelve for a three speed PAM generator. The contactor 28 can comprise, for example, a conventional contactor with a wafer switch mechanism, or a drum controller, which affects the desired speed change in response to controlled motion of an actuator 30. While the control and logic for the actuator 30 and contactor 28 can comprise many forms, it is preferred to filter and average the initiating control logic signals as wind speeds can fluctuate rapidly over a relatively short period of time. Many well-known types of statistical averaging are equally possible. Filtering can preferably be provided to produce a relatively long term average of wind speed, as measured at or near the hub 14 by an anemometer 32 or other wind measuring means. The anemometer provides a signal through connectors 34 to a low pass filter 36 and additional control logic 38, well known in the art, which produces, for example, a signal to the actuator indicative of a five minute average of wind speed. In addition or alternative to wind speed measurement as an input to the control logic for switching from one operational speed to another, measurement of electrical power output, filtered and properly conditioned through a power transducer and filter unit 40, also well known, can be averaged and utilized.

Figure 4:
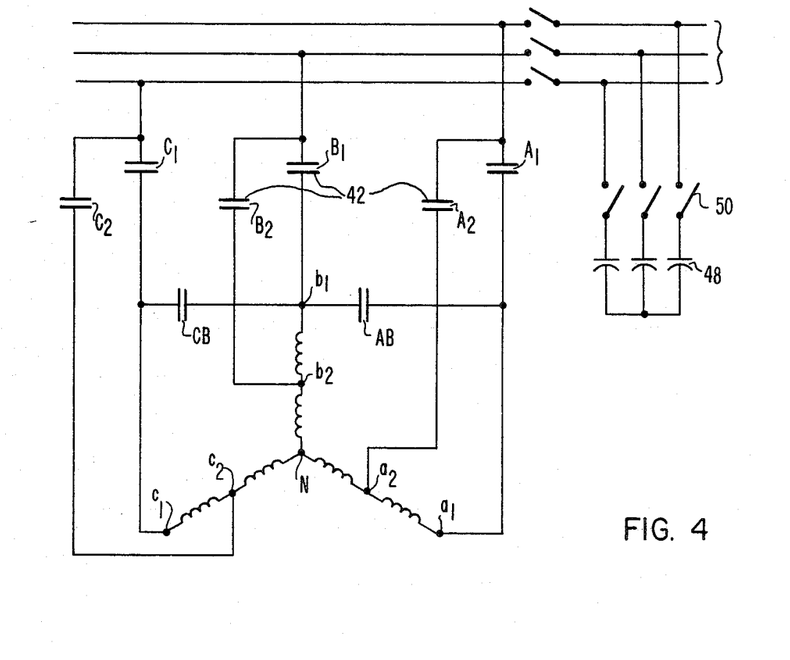
FIG. 4 is a circuit diagram of a two speed pole amplitude modulated motor operating as a generator and connected to a utility bus through a contactor assembly.
Figure 5:
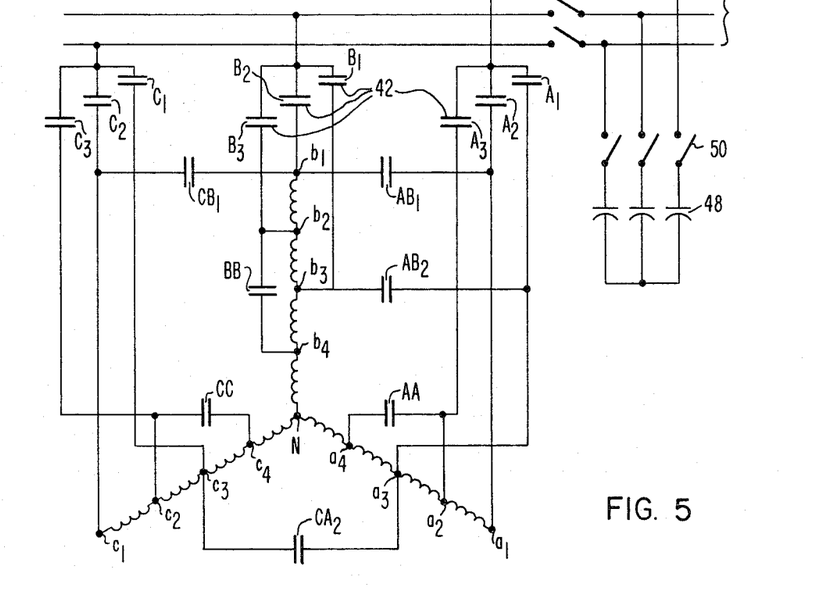
FIG. 5 is a circuit diagram, similar to FIG. 4, of a three speed system.

FIGS. 4 and 5 show a preferred circuitry for the contactor connection of, respectively, a two speed and a three speed PAM motor operating as a generator. Tables III and IV correspond respectively to the connected, designated by a "X", or open, designated by a "--", status of contacts 42 specifically identified by corresponding reference letters.

TABLE III

| | Contact Closures For Two Speed PAM | | | | | | | |
|---|---|---|---|---|---|---|---|---|
| Speed | $A_1$ | $A_2$ | $B_1$ | $B_2$ | $C_1$ | $C_2$ | AB | CB |
| High | — | X | — | X | — | X | X | X |
| Low | X | — | X | — | X | — | — | — |

TABLE IV

| | Contact Closures For Three Speed PAM | | | | | | | | | | | | | | |
|---|---|---|---|---|---|---|---|---|---|---|---|---|---|---|---|
| Speed | $A_1$ | $A_2$ | $A_3$ | $B_1$ | $B_2$ | $B_3$ | $C_1$ | $C_2$ | $C_3$ | $AB_1$ | $CB_1$ | $AB_2$ | $CA_2$ | AA | BB | CC |
| High | — | — | X | — | — | X | — | — | X | X | X | X | X | X | X | X |
| Inter. | X | — | — | X | — | — | X | — | — | X | X | — | — | — | — | — |
| Low | — | X | — | — | X | — | — | X | — | — | — | — | — | — | — | — |

Figure 6:
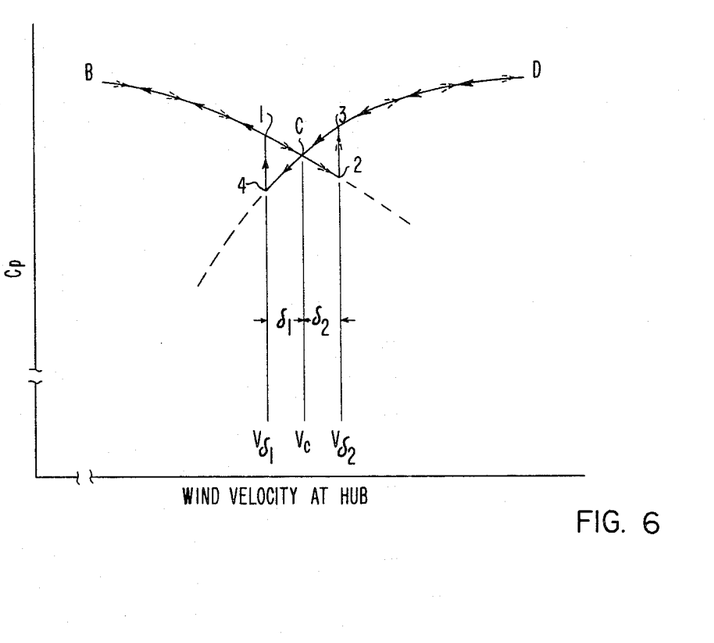
FIG. 6 is an enlargement and enhancement of the portion of FIG. 1 about point "C", additionally showing an operational overlap band.

The control system additionally preferably includes an overlap band in the speed switching circuit as illustrated in FIG. 6. For example, as the average wind speed as indicated by the control logic increases from a value near point "B" to a value near point "D", a change in the PAM motor/generator pole number to a lower value, and consequent higher synchronous speed, would be indicated at point "C". Conversely, as the average wind speed decreases from a value near point "D" toward a value near point "B", a changeover to a larger pole number would be indicated at point "C". However, if the determined average wind speed were to reside in the vicinity of point "C", fluctuating above and below the point "C" velocity, undesirable excessive switching back and forth between the required pole numbers would occur. This would tend to lower overall energy capture and unduly cycle the equipment. Accordingly, it is preferable to introduce into the control logic, in a manner well known in the art, an overlap band in wind speed, herein designated as δ1 and δ2, about each indicated speed switching value, such as point "C". Corresponding wind velocities are identified as Vδ$_1$, V$_C$ and Vδ$_2$. As noted in FIG. 6, a rising average wind speed would follow path B-1-C-2-3-D, shown by the dotted arrows, and a falling average wind speed would follow path D-3-C-4-1-B, shown by the solid arrows. With this operational switching there is no fixed speed about which the wind can dwell and cause excessive switching. The cusp in C$_p$ added by the overlap band to, for example, a 1⅓:1 speed ratio PAM motor/generator will still provide substantial increased system efficiency relative to the large cusp formed by a conventional 2:1 speed ratio generation system. The desired values of δ1 and δ2 will depend upon a number of parameters for a specific wind turbine generator system, including the bandwidth of the wind speed indicator filter and the statistical properties of the wind including its spectrum. The magnitudes of δ1 and δ2 are, however, preferably identical.

Figure 7:
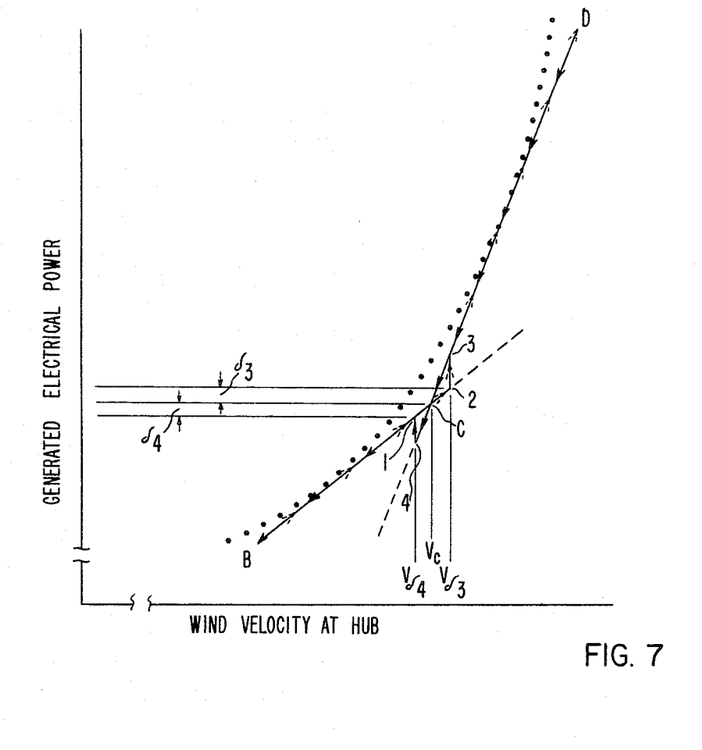
FIG. 7 is a graph plotting wind velocity at a turbine hub (X axis) versus generator electrical power (Y axis), additionally showing an operational overlap band.

A similar control system can also be based upon generated power. It is also desirable in such systems to utilize some filtering and a time averaging of the power indication. FIG. 7 illustrates such a control system including an overlap band of δ$_3$ above the ideal switch point power rating, point "C", and δ$_4$ below point "C", δ3 and δ4 preferably being identical. The corresponding wind velocities are Vδ$_3$, V$_C$ and Vδ$_4$. For increasing wind speed the PAM motor/generator unit output will increase generally along the line B-1-C-2-3-D shown by the dotted arrows, the switch in pole number occurring at point "2". For decreasing wind velocity the PAM motor/generator unit output will decrease generally along the line D-3-C-4-1-B, shown by the solid arrows, the switch occurring at point "4". The dotted line in FIG. 7 indicates the ideal output from a continuously variable speed wind turbine generator system. The actual values chosen for δ3 and δ4 will, in this case, additionally depend upon the dynamic response characteristics of the wind turbine generator system as connected to the utility bus.

At the point of switching of the PAM unit 26 pole numbers the following preferred sequence occurs. It is to be understood that other sequences and events are equally possible. For a preferred variable pitch wind turbine 12, the pitch is initially adjusted toward a feathering position so as to gradually reduce the PAM motor/generator output power toward zero where the unit is neither generating power nor taking power from the utility grid. The main breaker 44 (FIG. 3) to the utility bus 27 is then open. Subsequently, the turbine 12 pitch is adjusted to a selected orientation required to achieve a preselected operational speed, the turbine velocity being controlled by a separate speed control, well known in the art, for example a transducer 52 mounted on the turbine shaft 16 or generator shaft 22 which provides a signal to a preprogrammed comparator which controls turbine speed through variation of the turbine pitch, for example, by a pitch axis servo-mechanism as well known in the art. Movement of the turbine 12 through the zero power output condition assures that the gear box 24 structures are not unduly stressed. Alternatively a more complex, higher strength gear box can be provided. Preferably occurring at the same time as the adjustment of the turbine pitch, contactors 29 connect the PAM unit to provide the new pole number. The main breaker is then closed and the turbine pitch adjusted to a final preselected orientation associated with the new, either higher or lower, rotational speed. The amount of time during which the wind turbine generator system is disconnected from the utility bus will vary dependent upon design, and is expected to be approximately 10 seconds for an exemplary 100 kilowatt electric system with a 125 foot diameter turbine. The sequence, control system logic and equipment are applicable to any discrete multi-speed turbine generator system, for example a wind turbine generator employing multiple gear ratios and conventional generator apparatus to effect an improved C$_p$ with a changing wind velocity.

It may be desirable, dependent upon utility preference and design requirements, to accomplish a faster transition in speeds than with the above preferred procedure and to minimize the time delay and other affects of speed change on the utility grid system. This can be preferable for any generation system connected to a utility grid, particularly where periodic operational transitions are expected, and the following alternates are applicable to any such system. To accomplish an almost immediate transition with, for example, a PAM motor/generator 26, pole switching through the actuator/contactor can be made immediately upon a signal to change speeds. However, certain tradeoffs and design requirements are imposed.

Figure 8:
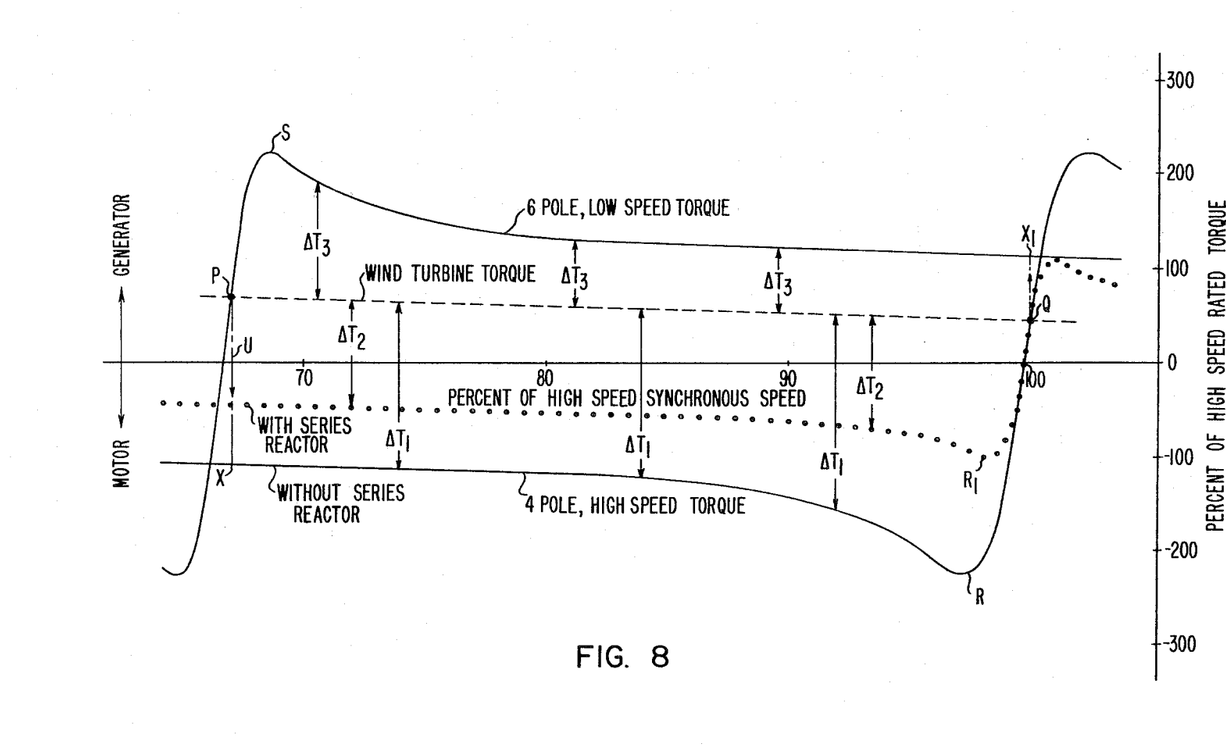
FIG. 8 is a graph plotting percent of a high synchronous speed (X axis) versus percent of the high speed rated torque (Y axis)

FIG. 8 shows the speed-torque characteristics of a PAM machine in a four pole, high speed configuration and a six pole, low speed configuration. With the unit 26 generating power in a six pole configuration operation is, for example, at point "P" on the speed-torque curve. Point "P" represents a stable operating condition where the accelerating wind turbine torque and the decelerating generator torque are equal and opposite. Upon a control signal to change to the high speed four pole configuration, the contactor assembly will reconnect the PAM unit for four pole operation in a fraction of a second and the speed-torque characteristic accordingly shifts, as exemplified by the dot-dash line U, to that of the high speed configuration. In this transitional condition the PAM unit operates as a motor and its torque combines with the wind turbine torque to produce a total accelerating torque identified in FIG. 8 as ΔT$_1$. This accelerating torque, ΔT$_1$ is relatively large, averaging in the approximate range of 175% of the PAM rated torque in the high speed configuration, during the transition in operational speeds from point "P" to point "Q". Point "Q" represents the new stable operating condition. The net torque loading the gear box 24, however, is relatively small since both the wind turbine torque and the PAM unit torque, through pole change, are accelerating torques tending to increase rotational velocity in the same direction. The resulting net torque across the gear box is the difference among the two accelerating torques, in the range of 75% of the rated high speed torque of the PAM unit 26. The important torque with respect to gear box design and loading is the maximum torque through the gear box 24, which occurs as the speed passes through the pull out torque, point "R", of the four pole high speed configuration, representing approximately 175% of the rated high speed torque. This would accordingly undesirably require an enhanced gear box, particularly with respect to gear tooth strength.

Additionally, during the accelerating time period the PAM unit acts as a motor and will initially draw an undesirably large amount of power and current from the utility grid, in the range of five times the rated current. This current draw drops to approximately three times the rated current at the pull out point "R", and continues a rapid drop to about half of the rated current at the new operational speed, represented by point "Q". Thus, in addition to imposing large torque loading on the speed increaser and the turbine 16 and generator 22 shafts, a large current draw from the grid during the accelerating period, approximately several seconds, would tend to cause excessive voltage fluctuations on the main grid.

Figure 9:
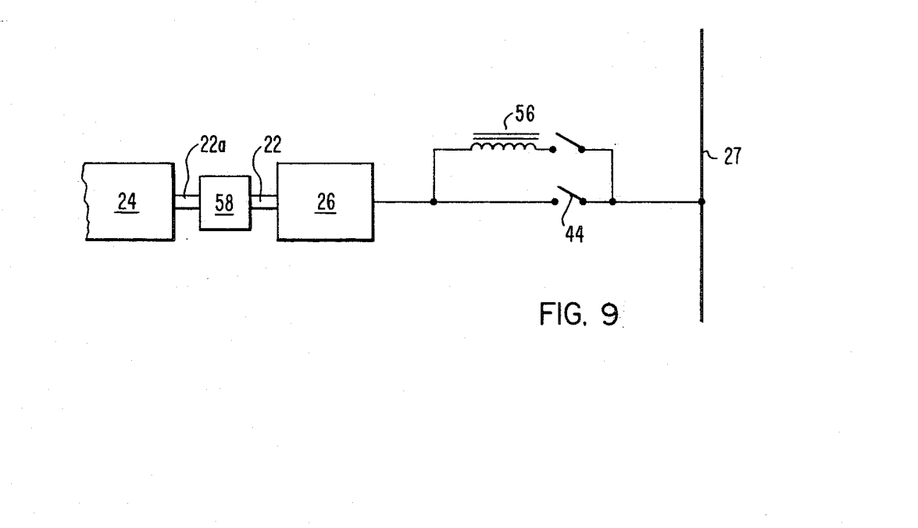
FIG. 9 is a simplified block diagram of another embodiment of the invention.

The current draw and peak mechanical loading can be substantially reduced, however, by the following alternatives, reference being made to FIGS. 3, 8 and 9. First, a voltage controlling or reducing device, such as a step-down transformer 54, can be interposed between the bus 27 and the PAM unit 26 during the transitional period. The transformer 54 would operate to reduce both the current draw and torque of the induction machine which accordingly reduces the current which would be drawn from the utility bus were the transformer 54 not present. While a transformer 54 will alleviate the impact on the utility grid, the transformer 54 and associated apparatus, such as the switching mechanisms, are costly, bulky and an added maintenance component.

Similarly a step-down auto transformer (not shown) can be interposed between the grid and the PAM unit during the switching transition. This apparatus suffers similar deficiencies.

A more attractive alternative is to interpose a current controlling or current limiting device, such as a current limiting reactor 56, typically comprising an inductance coil, between the PAM motor/generator 26 and the utility bus 27. The dotted curve of FIG. 8 shows the system speed-torque characteristic where a series reactor 56 is utilized. As noted from a comparison of the high speed, four pole curve and the dotted curve, the differences $\Delta T_1$ and $\Delta T_2$, and particularly a comparison of the pull out points "R" and "R$_1$", use of a series reactor 56 cuts the magnitude of the motor/generator torque approximately in half. This curve also shows that the torque available for acceleration would average about 100 percent of the motor/generator rated torque, at the high speed, over the period of acceleration. The maximum mechanical loading on the gear box and the shafts is also less than approximately 60% of the high speed rated torque. Additionally significant, the resulting current drawn from the utility is cut by a factor of about two as compared to operation without the series reactor 56.

When switching from the exemplary six pole configuration speed to the four pole speed, at the same time that the PAM unit 26 is reconnected to the four pole configuration the main breaker 44 would be opened and rapid acceleration occurs between points "P" and "Q". When point "Q" is reached the main breaker is closed and, as the series reactor 56 has fulfilled its current limiting function, minimal disturbance is imposed upon the wind turbine generator system apparatus or the utility grid.

In addition to use of a current limiting reactor for the low speed to high speed transition, other apparatus can also prove useful. FIG. 9 shows an overrunning clutch 58 interposed between the generator shaft 22 and a second portion 22a of the generator shaft. Upon reconnection of the PAM unit 26 for a higher speed, the overrunning clutch 58, which is preferably designed to disengage on torque reversal, will disengage and allow the PAM unit 26 to "run away" from the wind turbine 12. With the PAM unit disengaged, and thus not having to assist in accelerating the large inertia of the turbine 12, it will rapidly accelerate to the higher speed. The turbine will accelerate due to the increased wind speed and, preferably, a new pitch. The shafts 22, 22a will reconnect through the clutch preferably at a speed slightly in excess of synchronous speed. The combination of a series reactor 56 and an overrunning clutch 58 will thus acceptably limit current and voltage surges while reducing mechanical loadings.

In order to change speeds from, for example, a high speed four pole configuration to a low speed six pole configuration, such as a transition from point "Q" to point "P" in FIG. 8, the slower, approximately ten second transition described above is preferred to minimize overall impact, although a rapid sequence utilizing the series reactor 56 is also applicable. The rapid sequence does, however, provide substantial stresses on the wind turbine generator system and the utility grid, although mitigated to some degree by use of a series reactor. For example, during a high speed to low speed transition at full line voltage, without use of a series reactor, from point "Q" to point "P", the reconnected PAM unit 26 remains in a generator mode of operation. In this mode the unit develops an electromagnetic torque in a direction tending to decelerate the turbine 12 and generator 26. The wind turbine 12, however, would still be developing an aerodynamic torque in a direction tending to accelerate the turbine 12 and generator 26 since the wind velocity is still acting on the turbine. As shown in FIG. 8, as the decelerating generator torque is greater than the accelerating turbine torque, a decelerating torque represented by $\Delta T_3$, results. In this case the average decelerating torque during the transition from point "Q" to point "P", through point "X$_1$", would be approximately 100% of the high speed rated torque. While with this amount of torque the wind turbine generator system would decelerate at a reasonable rate without undue mechanical stresses, during the transition the PAM unit will operate as a generator delivering approximately four times the rated high speed configuration current. This high level of current would continue until the pull out point, "S", at which time the current is approximately 2¼ times the rated current. From pull out point "S" to the new operation point "P", the current delivery would drop rapidly to a value at or below the rated current. This large current surge would tend to disrupt the utility bus. Use of a series reactor 56 is likely unacceptable, with a constant turbine pitch, as a means for mitigating the disturbance to the utility system since, with a series reactor the decelerating torque available from the generator would be less than that shown in FIG. 8 for the low speed configuration and likely will lie below the wind turbine torque. In that event, the turbine would accelerate to dangerously high speeds. However, as discussed below, a series reactor 56 can be useful in this transition with a variable pitch turbine.

The mechanical stresses upon the gear box and shaft during this transition are also severe. While the net decelerating torque $\Delta T_3$ is the difference between the wind turbine torque and the PAM electromagnetic torque, the shafts and gear teeth are subjected to the sum of these values. In particular, at the pull out point the total mechanical torque would reach almost 300% of the high speed rated torque, requiring substantial design modification and associated cost. The effect of the current limiting reactor in this mode is likely to result in a decelerating torque which is too low to reasonably affect the desired transition, and an overrunning clutch will not disengage in this mode because torque reversal does not occur.

Thus, for a high speed to low speed transition it is preferable with a fixed pitch turbine to use the slower, approximately ten seconds, transition mechanism as the transition cannot easily be accomplished using merely the dynamic braking characteristics of the PAM generator 26. Additionally, with a variable pitch turbine, it is preferred to set the turbine pitch to either a zero torque or a braking torque position during a high speed to low speed transition. And, with the turbine pitch set for a zero or braking torque, a series current limiting reactor is preferably used to reduce surge currents and associated voltage transients on the utility grid.

Shown in FIGS. 3, 4 and 5 is a capacitor bank 48 and associated switches 50 which can be utilized to provide the excitation current for the PAM motor/generator 26 or for any induction type generator utilized in a wind turbine generator system. Upon closing the connection switch 50 the capacitor bank 48 is placed in parallel with the PAM motor/generator to supply the excitation voltage. This arrangement can be utilized where the electric utility desires to not provide the excitation power directly from the utility network.

EXAMPLE

The energy capture possible through use of a wind turbine generator system utilizing a PAM motor operating as a generator is illustrated by the following comparison of four systems each based upon a nominal 200 kilowatt electric wind turbine generator system with a 125 foot diameter turbine employing an ideally twisted fixed pitch turbine 12 and a 23xxx(NACA series) airfoil. The elevation of the turbine hub 14 is 100 feet and the statistical properties of the wind are represented by the Weibull distribution, $$P(V_{30}) = 1 - \exp[-(V_{30}/15.79)^{2.35}]$$

Where $V_{30}$ is the wind velocity in miles per hour at a 30 feet refeence elevation and $P(V_{30})$ is the probability that the wind velocity is less than or equal to $V_{30}$.

Figure 10:
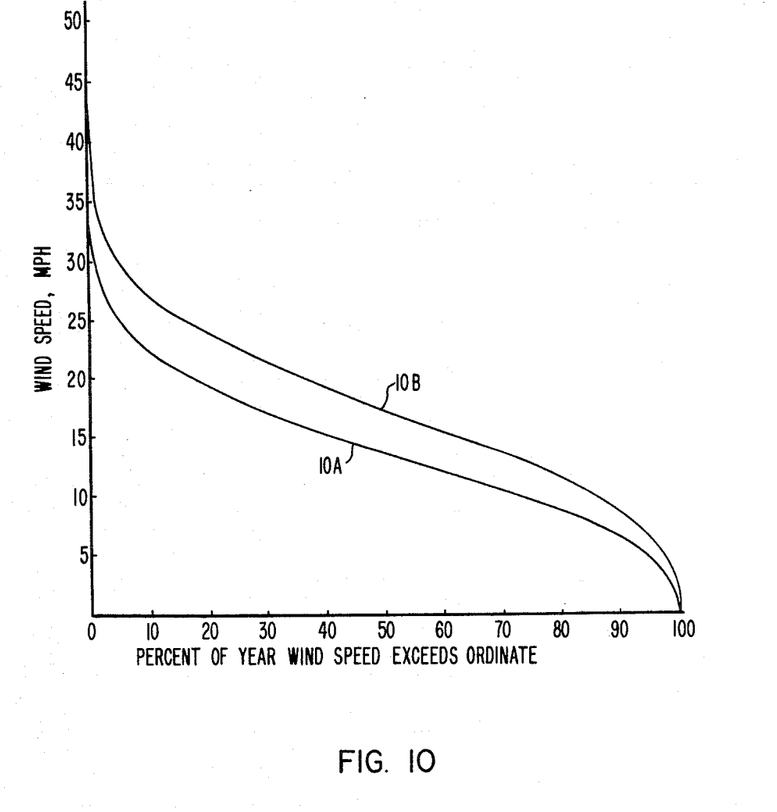
FIG. 10 is a graph plotting wind speed (Y axis) versus the percentage of time (X axis), on an annual basis, that the prevailing wind speed exceeds the Y axis speed, based upon a Weibull distribution.

A plot of a resulting distribution is shown in FIG. 10, curve 10A showing the distribution at a 30 foot hub height and curve 10B showing the distribution at a 100 foot hub height.

The four comparative wind turbine generator systems are (I) a single speed turbine and conventional generator, (II) a two speed turbine and generator with a 2:1 speed ratio obtainable with a conventional consequent pole induction motor operating as a generator, (III) a two speed turbine and generator with a 1.5:1 speed ratio obtainable with a four pole/six pole PAM motor operating as a generator, and (IV) a three speed turbine and generator with a 2:1½:1 speed ratio obtainable with a four pole/six pole/eight pole PAM motor operating as a generator.

In all four systems the operational speeds were chosen to maximize energy capture. FIGS. 11A through 11D show the $C_p$ valves for the four systems, and Table V identifies comparative parameters including annual energy capture of the four systems assuming a 95% wind turbine generator system availability. The energy capture of the single speed case is taken as 100%. The capacity factor is the ratio, expressed as a percentage, of actual energy captured to that which would be captured if the wind turbine generator system were able to operate at 100% of its rating for an entire year.

TABLE V

| | Relative Performance of 200 kWe WTG Systems | | | | |
|---|---|---|---|---|---|
| Case | Annual Energy Generation (kwh × 10⁶) | High Speed Turbine Shaft (RPM) | Turbine Shaft Torque at Rated Power (lb-ft) | Capacity Factor (%) | Relative Energy Capture % |
| I Single Speed | 0.939 | 35.8 | 42,766 | 53.53 | 100.0 |
| II Two Speed (2:1 Speed Ratio) | 0.949 | 39.7 | 38,565 | 54.15 | 101.16 |
| III Two Speed (1.5:1 Speed Ratio) | 0.968 | 40.0 | 38,276 | 55.21 | 103.14 |
| IV Three Speed (2:1½:1 Speed Ratio) | 0.977 | 41.5 | 36,892 | 55.75 | 104.15 |

Figure 11A:
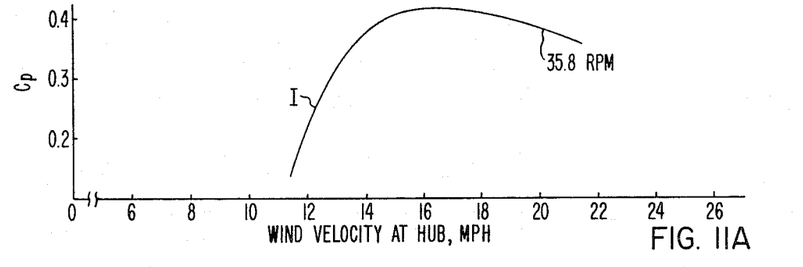
FIGS. 11A through 11D are comparative graphs plotting wind speed at a turbine hub (X axis) versus turbine $C_p$, for four respective exemplary cases.
Figure 11B:
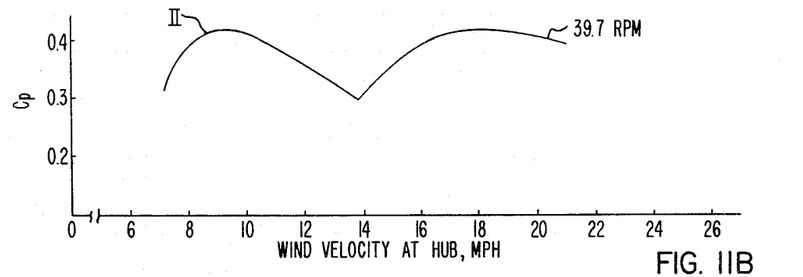
Figure 11C:
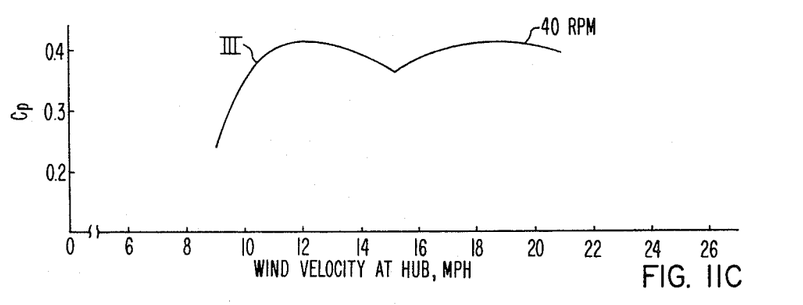
Figure 11D:
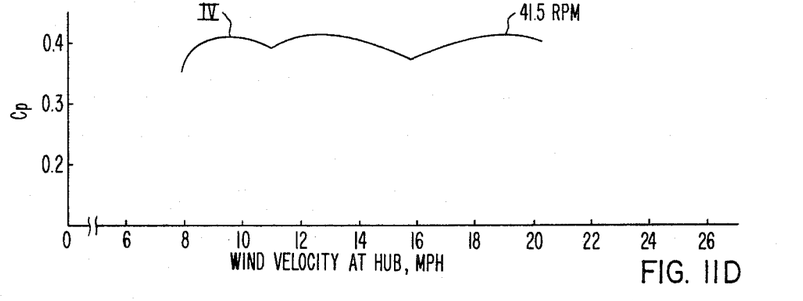

The increased performance utilizing a two speed or a three-speed PAM motor operated as a generator, respectively FIGS. 9C and 9D, is evident.

In addition to the annual energy capture increase and the improved utilization of fabrication materials provided through use of a PAM motor/generator 26 and selected operational speed ratios, some generally unexpected benefits are also apparent upon further evaluation of system performance. In all four exemplary cases noted in Table IV, the generated rated output is 200 kilowatts electric. At the rating point, in all four cases, the generator and gear box efficiencies are essentially the same and the mechanical power is transferred through the turbine shaft. However, the maximum turbine shaft speed is different in all four cases. The higher turbine shaft speeds achieved in cases III and IV correspond to lower turbine shaft torques. This lower input torque and corresponding higher input speed to the speed increasing gear box will reduce the weight, cost and design requirements of both the turbine shaft and the speed increaser. Further, dependent upon overall design, an increase in speed at the turbine shaft can advantageously result in a gear box increaser ratio and corresponding mechanisms that are lower in weight and which also require fewer meshes in, for example, the gear box 24. Fewer meshes not only reduce weight, but improve gear box efficiency.

Associated with the advantageous effect of allowing operation at higher turbine shaft speeds is the opportunity, for a given design, of maintaining the same shaft torque as comparison systems, and operating at a higher rated power level. Since the principle influence on gear increaser weight, size, and cost is the input torque at the turbine shaft 16, the gear box requirements and turbine/generator shaft mass do not change materially if the input torque is fixed. However, operation at a higher rated power would improve annual energy capture and allow operation with a larger generator.

For example, Table VI presents parameters, similar to Table IV for a non-optimized exemplary three speed wind turbine generator system, incorporating a four pole/six pole/eight pole PAM motor operating as a generator, having a turbine rotor operating, at its high speed, at approximately the same torque as the optimized single speed case I.

TABLE VI

| | Performance of 280 kWe System | | | | |
|---|---|---|---|---|---|
| Case | Annual Energy Generation (kwh × 10⁶) | High Speed Turbine Shaft (RPM) | Turbine Shaft Torque at Rated Power (lb-ft) | Capacity Factor (%) | Relative Energy Capture (%) |
| Three Speed (2:1½:1 Speed Ratio) | 1.157 | 50.0 | 42,869 | 47.12 | 123.22 |

As will be noted from Table VI, operation at essentially the same torque allows use of a 280 kilowatt electric PAM generator and an improved energy capture relative to the single speed case I of 123.22%.

Since numerous changes may be made in the abovedescribed apparatus without departing from the spirit and scope thereof, it is intended that all matter contained in the foregoing description or shown in the accompanying drawings be interpreted as illustrative and not in a limiting sense.

I claim:

1. Apparatus for controlling the transfer of electrical energy from a multi-speed pole amplitude modulated type dynamo electric machine powered by a wind machine generating alternating current to a primary electrical circuit comprising:

a. an electrical conduit between said dynamo electric machine and said circuit;
   b. a breaker for selectively opening and closing the flow of electrical energy through said conduit; and
   c. a current limiting reactor and associated means for connecting said reactor in series with said conduit during a transition from a low rotational speed to a high rotational speed of said dynamo electric machine.

* * * * *